US012798772B2

(12) United States Patent
Herter et al.

(10) Patent No.: US 12,798,772 B2
(45) Date of Patent: Nov. 17, 2026

(54) AIRCRAFT CABIN DIVIDER

(71) Applicant: ZIM AIRCRAFT SEATING GMBH, Immenstaad am Bodensee (DE)

(72) Inventors: Hartmut Herter, Tettnang (DE); Sven Achilles, Michelfeld (DE); Andreas Ulmer, Meckenbeuren (DE)

(73) Assignee: ZIM AIRCRAFT SEATING GMBH, Immenstaad am Bodensee (DE)

( * ) Notice: Subject to any disclaimer, the term of this patent is extended or adjusted under 35 U.S.C. 154(b) by 0 days.

(21) Appl. No.: 19/045,604

(22) Filed: Feb. 5, 2025

(65) Prior Publication Data

US 2025/0187730 A1 Jun. 12, 2025

Related U.S. Application Data

(63) Continuation of application No. PCT/EP2023/071353, filed on Aug. 2, 2023.

(30) Foreign Application Priority Data

Aug. 10, 2022 (DE) ..................... 10 2022 120 148.1

(51) Int. Cl.
*B64D 11/00* (2006.01)
*B64D 11/06* (2006.01)

(52) U.S. Cl.
CPC .... *B64D 11/0023* (2013.01); *B64D 11/06205* (2014.12); *B64D 2201/00* (2013.01)

(58) Field of Classification Search
CPC ............ B64D 11/0023; B64D 11/0606; B64D 11/0619; B64D 11/06205; B64D 2201/00
See application file for complete search history.

(56) References Cited

U.S. PATENT DOCUMENTS

| | | | |
|---|---|---|---|
| 5,085,382 | A | 2/1992 | Finkenbeiner |
| 2013/0009430 | A1 | 1/2013 | Islam et al. |
| 2015/0042078 | A1 | 2/2015 | Gehret et al. |
| 2015/0232184 | A1 | 8/2015 | Gehret et al. |
| 2015/0375844 | A1 | 12/2015 | Smithson et al. |
| 2017/0283060 | A1 | 10/2017 | Papke et al. |

(Continued)

FOREIGN PATENT DOCUMENTS

| | | |
|---|---|---|
| DE | 38 27 279 A1 | 2/1990 |
| EP | 3 439 957 B1 | 5/2020 |

(Continued)

OTHER PUBLICATIONS

English translation of the International Preliminary Report on Patentability (Chapter I) dated Feb. 20, 2025 (Application No. PCT/EP2023/071353).

(Continued)

*Primary Examiner* — Timothy D Collins
*Assistant Examiner* — Terri L Filosi
(74) *Attorney, Agent, or Firm* — Muncy, Geissler, Olds & Lowe, P.C.

(57) ABSTRACT

Apparatus for subdividing a passenger cabin of an aircraft, comprising a wall element, wherein the wall element has a securing element in order to be able to be secured to at least one element of the passenger cabin so that the wall element in a state installed within the passenger cabin subdivides the passenger cabin into a first region and a second region, wherein the wall element comprises at least one impact protection system.

13 Claims, 2 Drawing Sheets

(56) References Cited

U.S. PATENT DOCUMENTS

| | | | |
|---|---|---|---|
| 2019/0352010 | A1 | 11/2019 | Kabir et al. |
| 2021/0347485 | A1 | 11/2021 | Papke et al. |

FOREIGN PATENT DOCUMENTS

| | | | |
|---|---|---|---|
| EP | 3 160 731 | B1 | 6/2020 |
| WO | 2019/068028 | A1 | 4/2019 |

OTHER PUBLICATIONS

Squib (explosive). In: Wikipedia, The Free Encyclopedy. Bearbeitungsstand: Jun. 12, 2022, 07:20 UTC. URL:https://en.wikipedia.org/w/index.php?title=Squib_(explosive)&old id= 1092738362[abgerufen am Mar. 20, 2023].

German Search Report dated Mar. 20, 2023 (Application No. 10 2022 120 148.1).

International Search Report and Written Opinion dated Nov. 14, 2023 (Application No. PCT/EP2023/071353).

AIRCRAFT CABIN DIVIDER

CROSS REFERENCE TO RELATED APPLICATIONS

This application is a continuation of International Application No. PCT/EP2023/071353 filed Aug. 2, 2023, which designated the United States, and claims the benefit under 35 USC § 119(a)-(d) of German Application No. 10 2022 120 148.1 filed Aug. 10, 2022, the entireties of which are incorporated herein by reference.

FIELD OF THE INVENTION

The present invention relates to the technical field of apparatuses for subdividing a passenger cabin of an aircraft.

BACKGROUND OF THE INVENTION

The document EP 3 439 957 B1 already discloses a contoured class divider for subdividing an aircraft cabin according to a predetermined class arrangement. This class divider comprises a plate having a backwardly directed convex contour which closely corresponds to a backwardly directed contour of a backrest of a seat and which, for positioning, is configured in a closely spaced-apart relationship from the backrest, for providing an additional space in front of a seat which is positioned behind the plate.

SUMMARY OF THE INVENTION

The technical problem addressed by the present invention is to further develop or improve such an apparatus for subdivision so that the scope of use thereof is expanded.

All the features which are explained in connection with individual embodiments of the present invention can be provided in different combinations in the subject matter according to the present invention in order to simultaneously achieve the advantageous effects thereof.

The present invention is based on an apparatus for subdividing a passenger cabin of an aircraft. It comprises a wall element, wherein the wall element has a securing element in order to be able to be secured to at least one element of the passenger cabin so that the wall element in a state installed within the passenger cabin subdivides the passenger cabin into a first region and a second region.

The core of the present invention is that the wall element comprises at least one impact protection system.

In this case, the element of the passenger cabin can comprise, for example, a ceiling and/or a wall and/or a floor and/or a seat of the passenger cabin. For example, the wall element may be configured in a rigid manner and be in the form of a sight blocker or an aircraft class divider. The first region may be, for example, a first travel class and the second region may be, for example, a second travel class. The first travel class can, in the longitudinal extent direction of the aircraft, be arranged in front of the second travel class and consequently further forward in the aircraft in the flight direction.

The impact protection system may, for example, be configured for a person who is located in a seat in front of the apparatus, for example, in the manner of an airbag system. The wall element can subdivide the passenger cabin along a seat or along a seat group or along a seat row and transversely to a longitudinal extent of the aircraft.

Advantageously, it is consequently possible to provide for a passenger who is located in the region in front of the wall element, for example, in a seat, a protection means for the event of an accident and to protect the passenger against an impact. If, for example, only lap belts and not three-point belts are used in a seat, the passenger and in particular his/her upper body or his/her head can additionally be protected.

In a technically advantageous embodiment, there is provision for the wall element to extend in a vertical direction and to be able to be attached with at least a first end of the wall element to at least one element of the passenger cabin, and for the wall element to have the impact protection system in a region of a second end, for example, at a second end of the wall element.

For example, the first and second ends of the wall element are present with spacing from each other in the vertical direction. In the fitted state, for example, the first end extends up to a ceiling of the passenger cabin and the second end, for example, extends up to the region of a head of a person who is located on a seat.

Consequently, the impact protection system can advantageously be fitted at a suitable height and orientated with respect to a respective passenger. The wall element can further be secured, for example, to a ceiling and/or wall and/or floor and/or seat of the passenger cabin in order to be able to ensure adequate retention.

In another technically advantageous embodiment, there is provision for, in an installed state of the apparatus and/or in a triggered state of the impact protection system, at least portions of the impact protection system to be formed at a height between 0.3 m and 1.75 m from a floor of the passenger cabin.

The portions of the impact protection system may, for example, be in the form of an airbag of the airbag system. The term "triggered state of the impact protection system" may be understood to be, for example, the state in which the airbag system has been triggered and the airbag thereof has been completely deployed.

Thus, a passenger who is located in the region of the impact protection system can advantageously be protected from an impact, for example, against a backrest of a seat in front of him/her or against an existing class dividing element or wall element.

In a further technically advantageous embodiment, there is provision for, in the installed state of the apparatus and in the triggered state of the impact protection system, at least portions of the impact protection system to be formed at a height between 0.6 m and 1.5 m from a floor of the passenger cabin.

Thus, a passenger who is located in the region of the impact protection system can advantageously be protected from an impact, for example, explicitly against a head region of a backrest of a seat located in front of him/her or class dividing element or wall element.

Furthermore, there is provision in a technically advantageous embodiment for, in the installed state of the apparatus and in the triggered state of the impact protection system, at least portions of the impact protection system to be formed at a height between 0.9 m and 1.2 m from a floor of the passenger cabin.

Thus, a passenger who is located in the region of the impact protection system can advantageously be even better protected from an impact, for example, explicitly against a headrest of a seat located in front of him/her or class dividing element or wall element.

Furthermore, there is provision in a technically advantageous embodiment for, in the installed state of the apparatus and in a triggered state of the impact protection system, at least portions of the impact protection system to have in a horizontal extent a width between 0.3 m and 3.5 m.

For example, an impact protection system in front of the seat or the seat row can be associated with each seat of a seat row or it is possible to assign a single impact protection system which affords protection to several passengers at the same time as a result of the extents thereof to a plurality of seats.

Consequently, a more cost-effective production and a weight reduction can advantageously be enabled since all the elements and subassemblies of the impact protection system do not have to be provided for each individual seat.

There is provision in another technically advantageous embodiment for the wall element to comprise an airbag module or an airbag.

Consequently, independent operation of the apparatus and/or in particular a flexible installation and/or placement of the apparatus, for example, independently of an arrangement of the seats, can advantageously be enabled, which could be changed accordingly, for example, in different booking distributions and therefore occupations of the air passenger seats from flight to flight of the aircraft.

There is further provision in a technically advantageous embodiment for the wall element to comprise a gas generator.

This may advantageously and additionally enable independent operation of the apparatus and in particular flexible installation or placement of the apparatus. Consequently, for example, a repair friendliness of the apparatus can also be improved, whereby such a repair may be able to be carried out more quickly and more cost-effectively.

There is further provision in a technically advantageous embodiment for the wall element to comprise an electronic control element.

Such an electronic control element may, for example, be an electronic assembly module.

Advantageously, this can further enable independent operation of the apparatus and, in particular, a flexible installation or placement of the apparatus. For example, it may improve an assembly time of the apparatus within the aircraft because additional connection to any on-board electronic system can also be avoided.

There is further provision in a technically advantageous embodiment for the wall element to comprise an energy carrier.

The energy carrier may, for example, be in the form of a battery or accumulator.

Advantageously, this can further enable independent operation of the apparatus and, in particular, a flexible installation or placement of the apparatus. For example, it may simplify possible ways of authorizing or certifying the apparatus in aircraft.

There is further provision in a technically advantageous embodiment for the wall element to comprise an acceleration sensor.

Advantageously, this can further enable independent operation of the apparatus and, in particular, a flexible installation or placement of the apparatus. For example, it may allow autarchic triggering of the impact protection system, in particular, any additional elements of the aircraft, which can further simplify operational permissions of the apparatus.

There is further provision in a technically advantageous embodiment for the wall element to be in the form of an aircraft class divider.

Advantageously, elements which are required inside the aircraft cabin in any case, such as the aircraft class divider, can be used to allow impact protection. The advantages of an aircraft class divider can thus be linked with those of the apparatus and additional subassemblies or elements can be avoided, which can have an advantageous effect on a weight reduction.

There is further provision in a technically advantageous embodiment for the securing element to be configured in such a manner that the apparatus can be releasably secured to the aircraft by means of the securing element.

A mobility of the apparatus which allows flexible installation inside the aircraft and which can be adapted according to requirements can thereby advantageously be enabled.

According to another aspect, the technical problem of the present invention is solved by a unit comprising an apparatus and a seat row, wherein the seat row has at least one seat, wherein the wall element is arranged in front of the seat when viewed in the seat direction of the seat of the seat row, wherein, in the positioned state of the wall element relative to the seat row, the impact protection is provided in such a manner that a passenger who is using the seat can be protected by the impact protection system.

Consequently, the advantages of the apparatus can advantageously be integrated in a seat row of an aircraft.

According to another aspect, the technical problem of the present invention is further solved by an aircraft comprising an apparatus or a unit.

Consequently, the advantages of the apparatus can advantageously be integrated in an aircraft and the safety for the passengers can be improved.

There is provision in a technically advantageous embodiment for the wall element to be secured to at least one element of the passenger cabin of the aircraft so that the wall element subdivides the passenger cabin into a first region and a second region, wherein the second region is located behind the first region when the wall element is in an installed state in the flight direction.

There is further provision for the impact protection system to be in the form of, for example, a curtain airbag. There is further provision for the impact protection system to be autonomously functional and, for example, to be configured independently of the aircraft or independently of the seats of the aircraft.

Consequently, a flexible securing of the wall element can advantageously be enabled and use with reduced weight can be enabled.

BRIEF DESCRIPTION OF THE DRAWINGS

Exemplary embodiments of the present invention are illustrated in the drawings and are described in greater detail below.

DETAILED DESCRIPTION OF THE INVENTION

Figure 1:
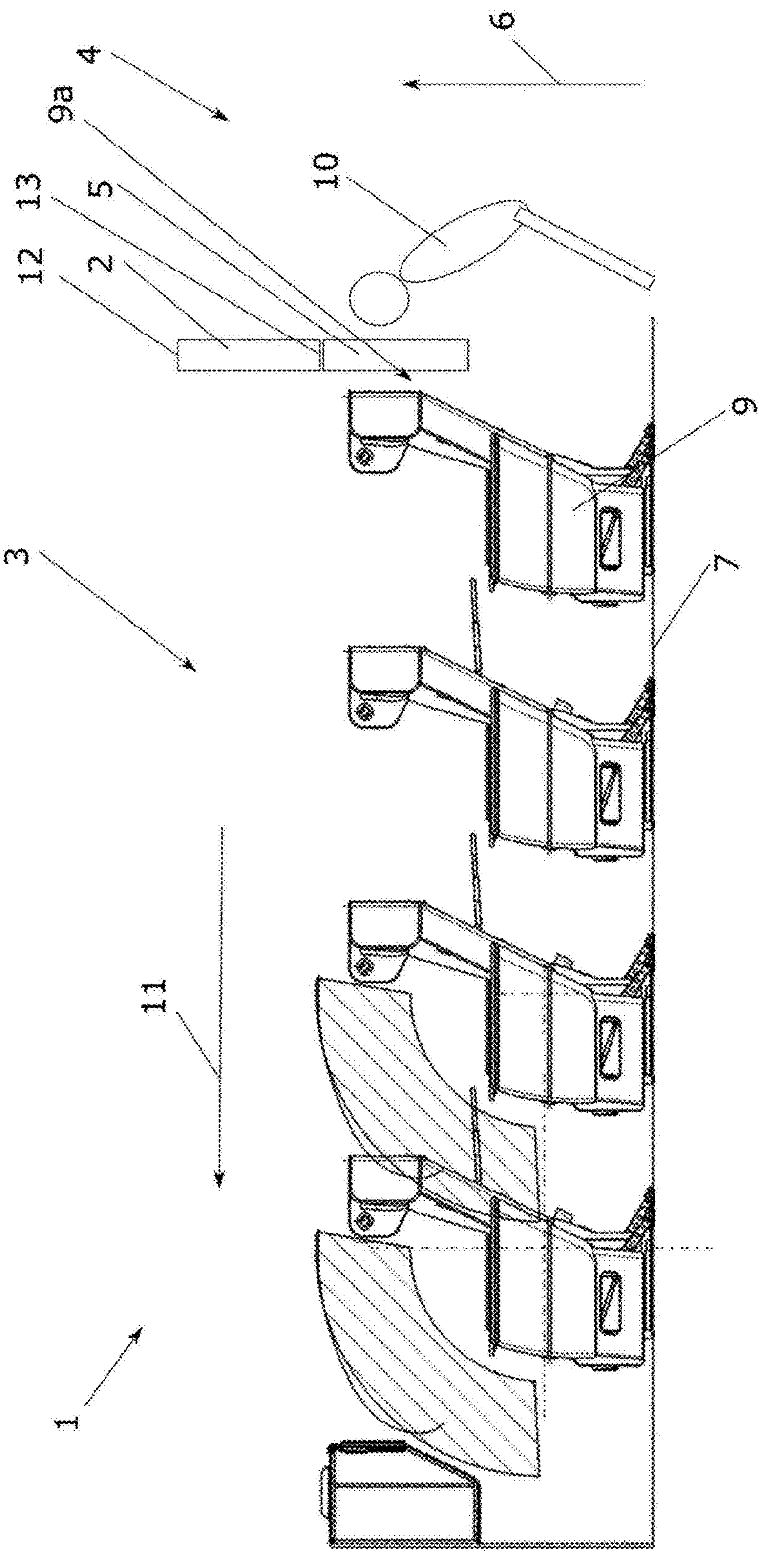
FIG. 1 shows a schematic side view of a first and a second region of a passenger cabin of an aircraft.

FIG. 1 schematically shows a side view of a passenger cabin 1 of an aircraft. The passenger cabin 1 is subdivided by means of a wall element 2 installed in the passenger cabin 1 which is in the form of an aircraft class divider into a first region 3 which is located further forward in the flight direction 11 and a second region 4 which is located further backward in the flight direction 11. The wall element 2 comprises, for example, an impact protection system which is illustrated in the triggered state, wherein, for example, a portion of the impact protection system 5 at a second end 13 of the wall element is schematically illustrated as a completely deployed air bag of the type of an airbag 5.

The wall element 2 is, for example, releasably installed on a ceiling (not illustrated) of the passenger cabin 1 with at least one first end 12 of the wall element 2, wherein there are also conceivable additional supports which are not illustrated or additional securing elements, by means of which the wall element 2 may be able to be attached to additional elements of the passenger cabin 1, for example, a seat 9.

The portions of the impact protection system 5, such as, for example, the airbag 5, extend in the triggered state in a vertical direction 6 and are formed at a height which extends from a floor 7 and which corresponds to an upper region 9*a* of the backrest of a seat 9 which is located in front of the passenger in the flight direction. Thus, in the event of an accident, a passenger 10 who is in the second region 4 of the passenger cabin 1 can be shielded by means of the impact protection system from an impact, for example, against at least portions of the seat 9 which is located in front of him/her, with the impact protection system.

It is not illustrated that the wall element 2 may comprise additional portions of the impact protection system and securing elements for the installation thereof, which is, for example, releasable, with respect to other elements, such as the ceiling and/or wall and/or floor of the passenger cabin 1.

Figure 2:
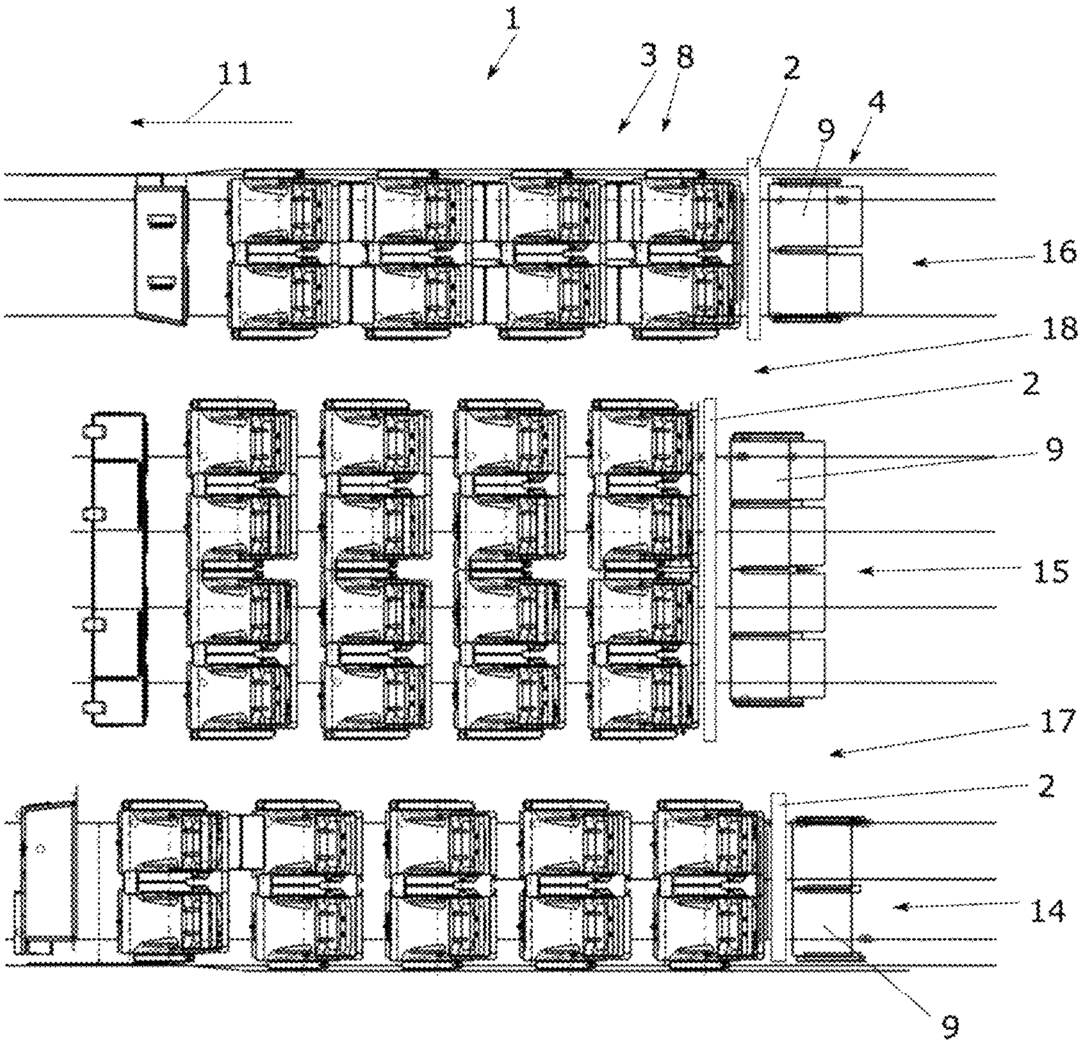
FIG. 2 shows a schematic plan view of a first and a second region of a passenger cabin of an aircraft.

FIG. 2 shows a schematic plan view of the first region 3 and second region 4 of the passenger cabin 1 with a plurality of wall elements 2 in an installed state. The first region 3 and the second region 4 of the passenger cabin 1 differ as a result of differently depicted seats 9, as may be the case, for example, in different passenger classes.

The passenger cabin 1 is further illustrated by way of example in a subdivided state with a region 14 which is located on the left in the flight direction 11, a region 16 which is located on the right in the flight direction 11 and a central region 15 which is located centrally between the left region 14 and the right region 16. The left region 14 is separated by means of a left passageway 17 from the central region 15 and the right region 16 is itself separated from the central region 15 by means of a right passageway 18.

For the passengers 10 who are located in the seats 9 of the second region 4 and who are illustrated in FIG. 1, the wall elements 2 separate the first region 3 and the second region 4 at least partially from each other and at least visually in the manner of a sight protection member.

Furthermore, FIG. 2 illustrates that the respective wall element 2 of the left, central or right region 14, 15, 16 can extend in a horizontal extent over several seats 9 and/or partially over a seat row 8. When viewed with FIG. 1, it is illustrated that the impact protection system can extend over several seats 9 or a separate impact protection system can be associated with each seat 9.

In the left region 14 of the passenger cabin 1, for example, the wall element 2 can be configured in such a manner that for the two seats 9 which are located immediately beside it and in the second region 4 a separate impact protection system or, for example, a separate airbag 5 is provided. Each individual passenger could thereby be protected independently of each other.

For example, the wall element 2 may be configured in the central region 15 of the passenger cabin 1 so that for all the seats 9 which are located immediately beside it and in the second region 4 of the passenger cabin 1, here by way of example four are depicted, a common impact protection system or, for example, a common airbag 5 is provided. Thus, costs during production or redundancies in the production can advantageously be reduced.

There may also be provision, for example, for in the right region 16 of the passenger cabin 1 the wall element 2 to be configured in such a manner that for the two seats which are located immediately beside it and in the second region 4, a common impact protection system or portions thereof 5 is/are provided.

Consequently, for example, the wall element 2 can be configured for different seat rows and/or for widths of several seats 9. Furthermore, for example, the wall element can comprise for each seat 9 an individual airbag 5 or, for example, for several seats 9 a common airbag 5.

LIST OF REFERENCE NUMERALS

1 Passenger cabin
2 Wall element; aircraft class divider
3 First region of the passenger cabin
4 Second region of the passenger cabin
5 Portion of the impact protection system; airbag
6 Vertical direction
7 Floor
8 Seat row
9 Seat
9*a* Upper region of the backrest of a seat
10 Passenger
11 Flight direction
12 First end of the wall element
13 Second end of the wall element
14 Left region
15 Central region
16 Right region
17 Left passageway
18 Right passageway

The invention claimed is:

1. An apparatus for subdividing a passenger cabin of an aircraft, comprising:

a wall element having a securing element that is secured to at least one element of the passenger cabin so that the wall element in an installed state within the passenger cabin subdivides the passenger cabin into a first region and a second region, wherein the wall element comprises at least one impact protection system, wherein the wall element extends in a vertical direction and is attached with at least a first end of the wall element to the at least one element of the passenger cabin, wherein the wall element comprises an airbag module or an airbag, and wherein the wall element has the at least one impact protection system at a second end of the wall element, and wherein the wall element functions as an aircraft class divider, and wherein the at least one element of the passenger cabin is a ceiling of the passenger cabin.

2. The apparatus according to claim 1, wherein in the installed state of the apparatus and/or in a triggered state of the at least one impact protection system, at least portions of the at least one impact protection system are formed at a height between 0.3 m and 1.75 m from a floor of the passenger cabin.

3. The apparatus according to claim 1, wherein in the installed state of the apparatus and in a triggered state of the at least one impact protection system, at least portions of the at least one impact protection system are formed at a height between 0.6 m and 1.5 m from a floor of the passenger cabin.

4. The apparatus according to claim 1, wherein in the installed state of the apparatus and in a triggered state of the at least one impact protection system, at least portions of the at least one impact protection system have in a horizontal extent a width between 0.3 m and 3.5 m.

5. The apparatus according to claim 1, wherein the wall element further comprises a gas generator.

6. The apparatus according to claim 1, wherein the wall element further comprises an electronic control element.

7. The apparatus according to claim 1, wherein the wall element further comprises an energy carrier.

8. The apparatus according to claim 1, wherein the wall element further comprises an acceleration sensor.

9. The apparatus according to claim 1, wherein the securing element is configured in such a manner that the apparatus can be releasably secured to the aircraft by means of the securing element.

10. A unit comprising an apparatus according to claim 1, and a seat row having at least one seat, wherein the wall element is arranged in front of the seat row when viewed in the seat direction of the at least one seat of the seat row, and wherein, in the installed state of the wall element relative to the seat row, the at least one impact protection system is provided in such a manner that a passenger who is using the at least one seat can be protected by the at least one impact protection system.

11. An aircraft comprising an apparatus according to claim 1.

12. The aircraft according to claim 11, wherein the wall element is secured to the at least one element of the passenger cabin of the aircraft so that the wall element subdivides the passenger cabin into a first region and a second region, wherein the second region is located behind the first region when the wall element is in an installed state in the flight direction.

13. The apparatus according to claim 1, wherein the wall element is mounted above a floor level of the passenger cabin of the aircraft and is not secured to a floor of the passenger cabin of the aircraft.

* * * * *